Sept. 15, 1931.   E. KNECHT   1,823,203

INSULATING SUPPORT FOR ELECTRIC MOTORS

Filed March 26, 1928

Inventor
Emil Knecht,
By W. P. McElroy
Attorney

Patented Sept. 15, 1931

1,823,203

UNITED STATES PATENT OFFICE

EMIL KNECHT, OF ERKNER, NEAR BERLIN, GERMANY, ASSIGNOR, BY MESNE ASSIGNMENTS, TO DUAL MOTORS LTD., OF LONDON, ENGLAND

INSULATING SUPPORT FOR ELECTRIC MOTORS

Application filed March 26, 1928, Serial No. 264,839, and in Germany January 24, 1928.

This invention relates to insulating supports for electric motors; and it comprises an insulating support for electric motors such as are used in talking machines, and the like, adapted for free suspension of the motor on the casing of the drive mechanism while kept in alinement and insulated therefrom.

Figure 1:
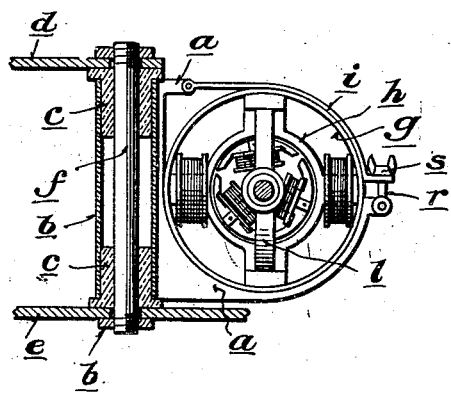
Figure 2:
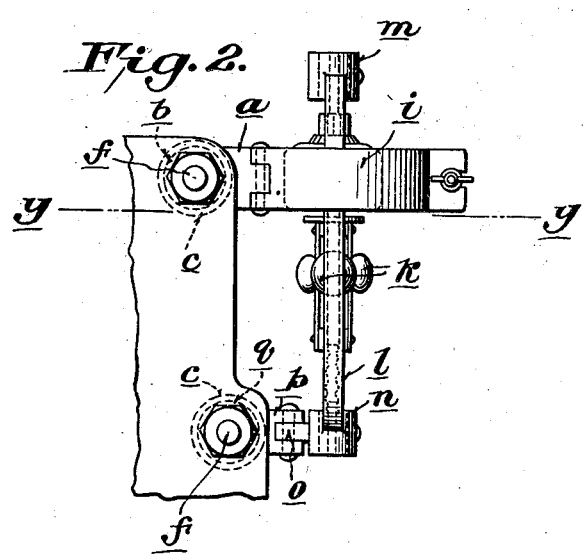

In the accompanying drawings I have illustrated more or less diagrammatically, a typical embodiment of the present invention. In this showing, Fig. 1 is a sectional view taken on the line $y$—$y$ of Fig. 2; and Fig. 2 is a plan view of Fig. 1.

In these views, the stator $h$ of a motor is mounted on a yoke-shaped frame $l$, in the ends of which are carried bearings $m$, $n$ for the rotor shaft, the pole pieces of the stator being surrounded by a ring $g$. The centrifugal governor of the motor is indicated at $k$.

The motor assemblage is adapted to be mounted upon the casing of the driving mechanism of a talking machine. The upper and lower plates of said casing are shown at $d$ and $e$, while $f$ is a transverse bolt joining said plates. On said bolt are mounted the insulating sleeve $c$, $c$, which are surrounded by the cylindrical portion $b$ of a bracket $a$, the lower half of which is formed as a concave seat for the ring $g$ of the motor. This arrangement insulates the bolts and plates against the bracket $a$. To the upper part of said bracket is hinged a strap $i$, which embraces the upper part of said ring $g$. To clamp the latter on its concave seat in the bracket $a$, the end of the latter carries a pivoted bolt $r$, which is passed through the slotted end of the strap $i$ and carries a wing nut $s$ on its free end.

There is another bolt $f$ secured in the plates $d$ and $e$, opposite the bearing $n$ of the motor carrier, which bearing is provided with a lug $o$. This second bolt $f$ is also provided with insulating sleeves $c$ and these are surrounded by a sleeve $q$, from which extend the lugs $p$, which embrace lug $o$. A pin passed through the lugs secure them together pivotally.

Thus the motor is freely suspended and insulated from the casing of the driving mechanism of the machine, but is maintained in perfect alinement, and can be removed, when necessary, as a self-contained unit.

Various modifications and changes can obviously be made without departing from the scope of the invention as expressed in the following claims.

What I claim is:—

1. In an electric drive for talking machines and the like a motor having a stator and a rotor, a driving gear carrier, means for suspending the motor from the driving gear carrier comprising vibration insulated bolts in said carrier, a seat for the stator of the motor carried on one of said bolts and a swinging connection to one of the bearings of the rotor shaft from the other of said bolts.

2. The combination with the drive gear casing of a talking machine, of means for supporting an electric motor on said casing, comprising two bolts in said casing, a bracket having a concave seat for a portion of the motor assemblage swiveled on one of said bolts, a hinge support for another portion of said assemblage swiveled on the other bolt, and vibration absorbing insulation between said bolts and said bracket and support.

3. The combination with the drive gear casing of a talking machine, of a bolt, vibration absorbing insulation around the bolt, a bracket around the insulation and carrying a seat at one end of the bolt, the said seat carrying an extension and complementary locking means on said extension, another extension pivoted to the bracket near the other end of the bolt and ending in proximity to the first said extension, and locking means on said extension, whereby the motor may be removably secured in the said seat.

In testimony whereof I affix my signature.

EMIL KNECHT.